Dec. 11, 1923.

W. N. MOTTER 1,476,997

SPEED CONTROL SYSTEM

Filed Nov. 3, 1919   2 Sheets-Sheet 2

Patented Dec. 11, 1923.

1,476,997

UNITED STATES PATENT OFFICE.

WILLIAM N. MOTTER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SPEED-CONTROL SYSTEM.

Application filed November 3, 1919. Serial No. 335,963.

*To all whom it may concern:*

Be it known that WILLIAM N. MOTTER, a citizen of the United States of America, residing at Milwaukee, in the county of Milwaukee and State of Wisconsin, has invented a certain new and useful Improvement in Speed-Control Systems, of which the following is a specification.

This invention relates to speed controlling systems and is particularly useful for controlling two or more motors which motors may be applied to do the work of driving the rolls of a steel mill, paper mill, sugar mill, etc.

It frequently occurs in connection with machinery driven by a plurality of motors, especially where the machinery acts upon a continuous piece of material, that it is desirable to keep the speed ratios of all of the motors constant so that, for example, the material will not be stretched, or sag or be buckled between the various elements of the machinery. Accordingly, one of the objects of the invention is the provision of a system whereby the ratio of the speeds of two motors may be kept substantially constant, even though the speed of one of the motors may vary.

Another object of the invention is the provision of a system whereby the ratios of the speeds of a plurality of motors may be kept substantially constant, even though the speed of one of the motors may vary.

Another object of the invention is the provision of a system for accomplishing the above named results in a positive and direct manner, and whereby the predetermined speed ratios of the motors may be varied by mechanical means. Other objects will appear hereinafter as the description of the invention proceeds.

The novel features of the invention will appear from this specification and the drawings which form a part thereof and show three embodiments of the invention, and all these novel features are intended to be pointed out in the claims.

Figure 1:
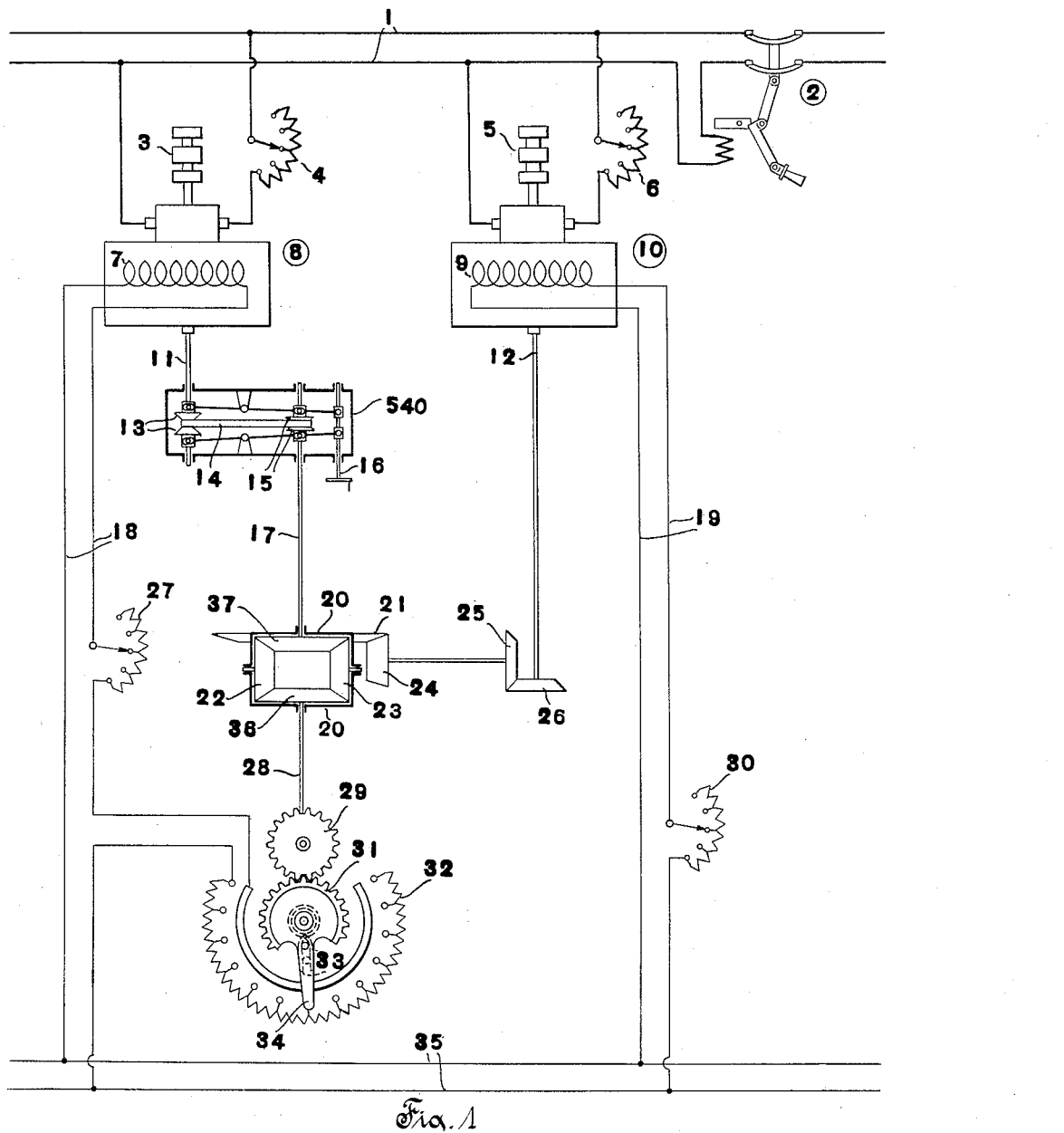

In the drawings Fig. 1 shows the invention, in diagrammatic form, as it may be applied to the regulation of the speeds of two motors.

Figure 2:
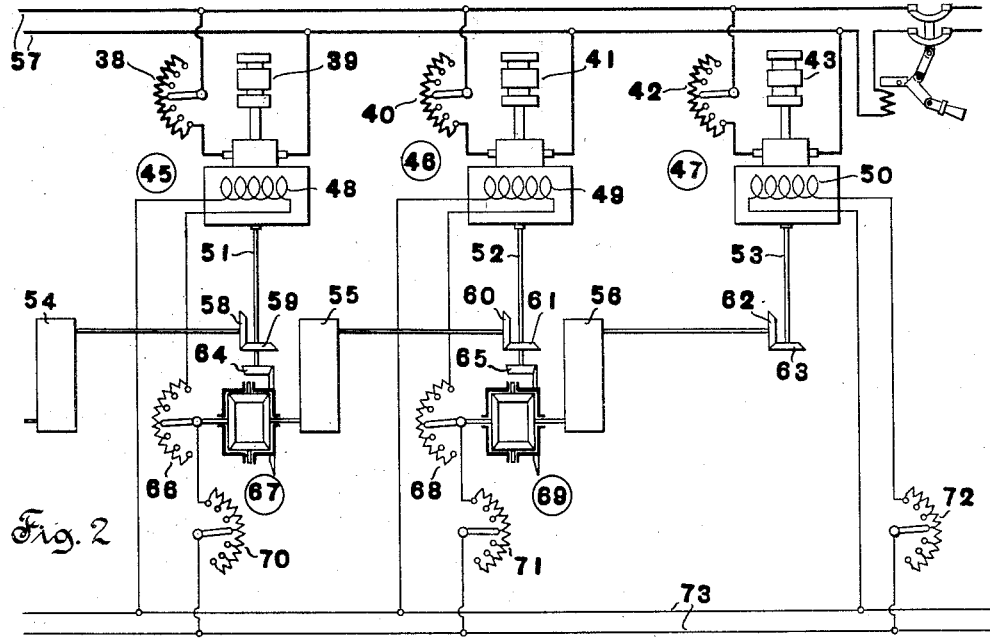

Fig. 2 shows the invention, in diagrammatic form, as it may be applied in and extended to the regulation of the speeds of more than two motors.

Figure 3:
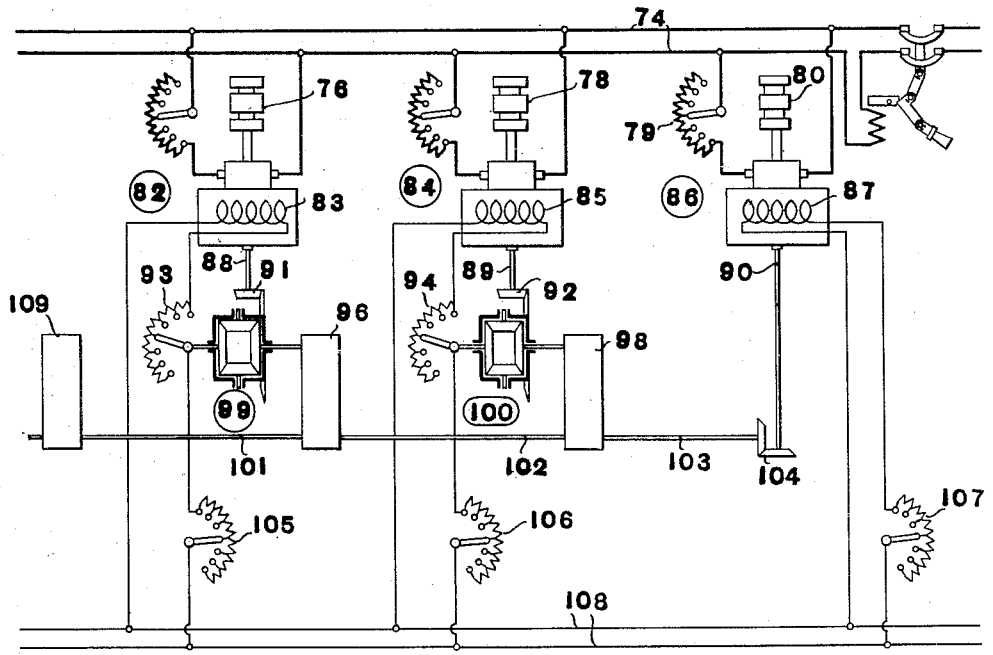

Fig. 3 is a modification of the type of embodiment disclosed in Fig. 2.

In Fig. 1, motors 8, 10, to be regulated, are shown fed from the supply line 1. The motors are here shown as of the direct current type, for purposes of illustration, and may be started by rheostats 4, 6 through the armature circuits thereof respectively, although any other starting means, or other sources of supply may be utilized.

The motor 10 is provided with an auxiliary shaft 12 connected in any convenient manner to the main shaft of the motor. This auxiliary shaft may be of small size as it is not intended to transmit any substantial amount of power as will hereinafter more fully appear. A bevel pinion 24 is driven from the auxiliary shaft 12 through a pair of bevel gears 25, 26. The bevel pinion 24 meshes with a bevel gear 21 associated with the housing 20 of a differential gear. With said housing are also associated the planetary gears 22, 23 constituting one element of the differential gear. The planetary gears cooperate with the bevel gears 36, 37 comprising the other two elements of the differential gear. The bevel gear 37 is driven by a shaft 17 which in turn is driven by an auxiliary shaft 11 associated with the main shaft of the motor 8. Between the shafts 17 and 11 is interposed a speed changing mechanism 540. This speed changing mechanism may be of any suitable form but is preferably one utilizing only mechanical force as is implied by the term mechanism. The speed changing mechanism here shown comprises two double conical pulleys 13, 15, the two frustoconical portions of each pulley being movable toward and away from each other. Mechanism may be provided for moving the parts of one pulley toward each other while moving the parts of another pulley away from each other, operated by the shaft 16, the effect being to vary the relative diameters of the effective driving portions of the pulleys cooperating with the belt 14. Turning of the adjusting shaft 16 in one direction or the other thus causes a variation in the speed ratios of the shafts 11, 17. The mechanism 540 may, if desired, be interposed between the other motor and the differential as shown, for example, in Fig. 2.

The motor 10 is provided with a field winding 9 supplied from the exciter bus 35 through leads 19 and a rheostat 30. The field 7 of the motor 8 is also supplied from the exciter bus 35 through leads 18, an adjusting rheostat 27 and a regulating rheostat 32 being connected in series.

The movable member 34 of the regulating rheostat is mounted to move with a mutilated gear 31 driven by a gear or pinion 29 associated with a shaft 28. The shaft 28 may be driven from one of the elements of the differential gear, in the instance shown, the bevel gear 36.

The motors 8, 10 are here shown as driving the rolls 3, 5 of a steel mill, although their application is, of course, not limited to this use.

A circuit breaker 2 may be provided in the main lines of supply to stop the motors in case of overload.

The operation of the system disclosed in Fig. 1 is as follows:

Assuming that the motors 8, 10 are operating at normal speed the material passing through the rolls 5 goes to the rolls 3 and it is clear that in order to prevent the material between these rolls from being either stretched or buckled the speed of the motor 8 must not remain constant if the speed of motor 10 varies, but the ratio of the speeds of the two motors must remain the same. If the motors are operating at their proper speeds the shafts 12, 17 will rotate at such relative speeds as to result in no motion of the bevel gear 36 of the differential and thus the arm 34 of rheostat 32 will remain stationary. If, however, the speed of motor 10 varies there will be a resultant motion of the bevel gear 36 and the arm 34 will be moved so as to either increase or decrease the speed of motor 8 as the case may be. A similar action will clearly take place if the speed of motor 8 is varied, as for example, by the addition or removal of load, any variation being immediately reflected in the movable arm 34 of the regulating rheostat, thereby keeping the speed of motor 8 at its initial value, assuming that there has been no change in the speed of motor 10.

The predetermined speed ratio which is kept constant by the system hereinbefore described may be set and changed by the speed changing mechanism 540. Assuming the motors 8, 10 to be operated at a given speed ratio and that the adjusting shaft 16 of the speed changing mechanism is operated to cause the ratio of the speed of the shaft 11, to that of shaft 17 to become larger, the bevel gear 37 will at first be driven at a speed which will cause motion of the bevel gear 36 and consequently of the movable arm 34. The movable arm 34 will act to regulate the resistance of the field 7 of the motor 8 to such an extent that the speed of said motor and consequently shaft 17 with respect to the speed of the shaft 12 will be again of such a value that no motion of the bevel gear 36 will result. It is clear that to accomplish this the speed of motor 8 with respect to the speed of motor 10 need not be so high as before adjustment of the shaft 16 was made, because of the higher speed ratio between shafts 11, 17. The newly predetermined speed ratio will then be kept constant by the differential speed regulating system in the manner already described.

Adjustment of the regulating performance of the rheostat 32 may be secured by the adjusting rheostat 27. The speed of motor 10 may be varied by rheostat 30.

If at any time there is a wide difference between the speeds of motors 8, 10 it is desirable that there be some form of interruptible connection between the regulating rheostat arm 34 and the bevel gear 36 to prevent overtravel and continuous rotation of the said arm. This is provided for by the mutilated pinion 31.

A centering spring 33 is provided which biases the arm 34 to a substantially central position whether the arm be moved clockwise or counterclockwise. Assuming that gear 29 has rotated in a counterclockwise direction and rotated gear 31, against the bias of spring 33, in a clockwise direction to the left hand limit of the control range of arm 34, the driving connection will clearly be interrupted and further rotation of gear 29 in the same direction will have no effect on gear 31. If, now, the direction of rotation of gear 29 be reversed, the driving connection will obviously be re-established automatically due to the biasing action of spring 33.

One of the ways in which the invention may be applied in and extended to the regulation of more than two motors is shown in Fig. 2 in which each motor is controlled from the next preceding motor. All of the motors 45, 46, 47 may be supplied from the main line 57, suitable starting means as the rheostat 38, 40, 42 being provided. Motor 47 is provided with an auxiliary shaft 53 driving one element of the differential 69 through the speed changing mechanism 56 (which is here indicated as similar to mechanism 540 in Fig. 1) and the bevel gears 62, 63. The next motor 46 drives another element of the differential 69, through an auxiliary shaft 52 and a bevel pinion 65. The third element of the differential controls the regulating rheostat 68 which is in series with the field winding 49 of motor 46.

From the auxiliary shaft 52 of motor 46 is also driven a pair of bevel gears 60, 61, transmitting motion through the speed changing mechanism 55 to one element of another differential gear 67. A second element of said differential is driven through the bevel pinion 64 by the auxiliary shaft 51 associated with the next motor 45. The third element of the differential 67 controls the movable arm of the regulating rheostat 66, in series with the field winding 48 of motor 45.

If there are more than three motors the auxiliary shaft 51 may in like manner drive a pair of bevel gears 58, 59 to a speed changing mechanism 54 of the next motor, and so on.

The speed of motor 47 may be controlled by the field rheostat 72.

Adjusting rheostats 70, 71 may be provided in the field windings of motors 45, 46 as already noted in connection with Fig. 1, and all of the field windings may be supplied from the exciter bus 73.

The operation of the system disclosed in Fig. 2 is as follows:

While the motors are running at their normal speed ratios the speeds are such that the two elements of the differential 69, driven respectively by motors 46, 47, and the two elements of differential 67, driven respectively by motors 45, 46, rotate at speeds such that there will be no resultant motion of the arms of the regulating rheostats 66, 68. Should, however, the speed of motor 47 change either by reason of a variation of load or by reason of direct speed control through the rheostat 72, the arm of the regulating rheostat 68 will move in such a direction that the speed of motor 46 will follow that of motor 47 and in such proportion that the speed ratio of the two will remain the same. As a result of the fact that motor 46 also drives one of the elements of the differential 67 associated with motor 45 the change in speed of motor 46 will cause such a resultant motion of the arm of the regulating rheostat 66 that the speed of motor 45 will follow that of motor 46, and in such proportion that the speed ratio will remain at its initial value. It will thus be seen that the speed ratios of the entire set will remain the same.

Motors 45, 46, 47, are shown as each driving rolls or other work devices 39, 41, 43, but this is not essential as, for example, motor 47 may be a small motor running light except for the small load imposed by the differential speed controlling means.

The system disclosed in Fig. 3 differs from that in Fig. 2 in that each motor is controlled from what may be termed the first motor or master motor directly and not from the next preceding motor. This is accomplished by causing the master motor 86 controlled by the starting means 79 and fed from the supply line 74, to drive an auxiliary shaft 90 and, in turn, a line shaft which may comprise parts 101, 102, 103 through the bevel gears 104. A differential gear 100 is driven on the one hand through the bevel pinion 92 and the auxiliary shaft 89 associated with the next motor 84, and on the other hand from the line shaft 103 through the speed changing mechanism 98. The third element of said differential controls the regulating rheostat 94 in series with the field 85 of the motor 84. Another differential 99 is in like manner controlled from the motor 82 and from the shaft 102 through the speed changing mechanism 96. The third element of said differential controls the regulating rheostat 93, in series with the field winding 83 of motor 82. If there are more than three motors the next succeeding motor will be controlled from a speed changing mechanism 109, and so on. The master motor 86 may have its speed controlled by its field winding 87 and the rheostat 107, and all of the field windings of the motors may be fed from the exciter bus 108, and as in the previous instance, adjusting rheostats 105, 106 may be provided.

The motors in Fig. 3 are indicated as driving rolls 76, 78, 80 respectively, but as stated in connection with Fig. 2 it is not essential that the master motor 86 drive any work device.

The operation of the system disclosed in Fig. 3 will be clear without any further description.

It should be understood that it is not desired to limit the invention claimed to the exact details of construction herein shown and described, for obvious modifications may occur to persons skilled in the art.

It is claimed and desired to secure by Letters Patent:

1. In combination, two motors, means for maintaining the relative speed of said motors constant including differential means having elements which are adapted to be continuously responsive to the speeds of said motors, means controlled by differential movement of said differential means for controlling one of said motors, said controlling means having a definite control range, and means providing for the condition of abnormal difference in speed between said motors including an interruptible driving connection between said controlling means and said differential means, whereby said differential means cannot move said controlling means out of its control range, and whereby a differential movement of said differential means corresponding to motion of said controlling means into said control range causes reestablishment of said driving connection.

2. In combination, two motors, means for maintaining the relative speed of said motors substantially constant including differential means having elements which are adapted to be continuously responsive to the speeds of said motors, a field rheostat for one of said motors controlled by differential movement of said differential means, said rheostat having a definite control range, and means providing for the condition of abnormal difference in speed between said motors including an interruptible driving connection between said rheostat and said differential means whereby said differential means cannot move said rheostat out of its control range and whereby a differential movement of said differential means corresponding to motion of said rheostat into said control range causes reestablishment of said driving connection.

3. In combination, two motors, means for maintaining the relative speed of said motors constant including differential means having elements which are adapted to be continuously responsive to the speeds of said motors, means controlled by differential movement of said differential means for controlling one of said motors, said controlling means having a definite control range, and means providing for the condition of abnormal difference in speed between said motors including an interruptible driving connection between said controlling means and said differential means, said interruptible driving connection including a mutilated gear associated with said controlling means and a gear driving said mutilated gear associated with said differential means whereby said differential means cannot move said controlling means out of its control range and whereby a differential movement of said differential means corresponding to motion of said controlling means into said control range causes reestablishment of said driving connection.

4. In combination, two motors, means for maintaining the normal relative speed of said motors substantially constant including differential means having elements which are adapted to be continuously responsive to the speed of said motors, means controlled by differential movement of said differential means for controlling one of said motors, said controlling means having a definite control range, and means providing for the condition of continued differential movement resulting from a continued abnormal relative speed including interruptible means between said controlling means and said differential means whereby when said differential means has moved said controlling means to a limit of its control range said differential means may continue its movement without affect on said controlling means, and a spring included in said interruptible driving means for causing re-establishment of the driving connection when said differential movement corresponds to motion of said controlling means into said control range.

In testimony whereof, the signature of the inventor is affixed hereto.

WILLIAM N. MOTTER.